United States Patent

Ciolli

[11] 4,364,286
[45] Dec. 21, 1982

[54] BI-DIRECTIONAL SPEED REDUCING MECHANISM

[75] Inventor: Donald A. Ciolli, University Heights, Ohio

[73] Assignee: The Rotor Tool Company, Cleveland, Ohio

[21] Appl. No.: 122,080

[22] Filed: Feb. 15, 1980

[51] Int. Cl.³ .................. F16H 5/10; F16H 57/10
[52] U.S. Cl. ........................ 74/768; 74/788; 192/48.92; 188/134
[58] Field of Search ............ 74/768, 769, 785, 788, 74/810, 812, 792, 784; 192/12 BA, 48.92; 188/77 W, 82.6, 134

[56] References Cited

U.S. PATENT DOCUMENTS

| | | | |
|---|---|---|---|
| 2,388,699 | 11/1945 | Morrill | 188/77 W |
| 2,588,187 | 3/1952 | Weiser | 74/812 X |
| 2,682,789 | 7/1954 | Ochtman | 74/768 |
| 2,775,144 | 12/1956 | Kelbel | 74/769 |
| 2,826,937 | 3/1958 | Ochtman | 74/788 X |
| 2,885,042 | 5/1959 | Frechette | 192/12 BA |
| 2,885,896 | 5/1959 | Hungerford, Jr. et al. | 192/48.92 |
| 2,951,568 | 9/1960 | Hungerford, Jr. et al. | 192/12 BA |
| 2,959,986 | 11/1960 | Irgens et al. | 74/792 |
| 3,064,766 | 11/1962 | Hanizeski | 188/77 W |
| 3,153,370 | 10/1964 | Heimall | 188/77 W |
| 3,193,066 | 7/1965 | Tomko | 188/134 X |
| 3,217,564 | 11/1965 | Smith | 74/788 X |
| 3,329,242 | 7/1967 | Minarick et al. | 188/134 |
| 3,528,533 | 9/1970 | Sacchini | 188/77 W X |
| 3,542,160 | 11/1970 | Sacchini | 188/77 W |
| 3,835,972 | 9/1974 | Helander | 192/12 BA X |
| 3,877,554 | 4/1975 | Wojtowicz | 192/12 BA |
| 3,921,771 | 11/1975 | Szabo | 192/12 BA |
| 3,994,186 | 11/1976 | Anderson | 188/77 W |
| 4,221,284 | 9/1980 | Hoff | 192/12 BA |
| 4,255,987 | 3/1981 | Ciolli | 74/768 |

FOREIGN PATENT DOCUMENTS 706287  3/1931  France .......................... 192/12 BA Primary Examiner—Lawrence J. Staab
Assistant Examiner—Lawrence J. Gotts
Attorney, Agent, or Firm—Maky, Renner, Otto & Boisselle

[57] ABSTRACT

A bi-directional, speed reducing mechanism for use with hand-held power tools comprises a pair of epicyclic gear trains mounted in a common carrier which each independently engage one of a pair of cages or ring gears disposed thereabout. The cages may alternately be locked in a stationary position or released for free rotation by independent activation of one of two identical wrap spring brakes disposed about each of the cages. The mechanism is contained within a generally cylindrical housing suitable for positioning between a conventional unidirectional power tool motor and gear head or powered device. In addition to the reversing capability, speed reduction in the range from 3.5:1 to 9:1 is also achieved by this mechanism.

5 Claims, 5 Drawing Figures

4,364,286

BI-DIRECTIONAL SPEED REDUCING MECHANISM

BACKGROUND OF THE INVENTION

The invention relates to a bi-directional speed reducing mechanism and more particularly to a bi-directional mechanism for use with hand-held power tools having separable motors and gear heads between which the instant invention may be mounted. The bi-directional speed reducing mechanism of the instant invention also achieves a reduction in output speed in the range of from 3.5:1 to 9:1 with a concommitant increase in output torque.

The dictates of mass production have resulted in great dependence upon the production line method of manufacturing and this dependence has in turn necessitated the development of a broad scope of lightweight, hand-held power tools for use by assembly personnel on the production line. Generally, these tools are powered by either compressed air or electricity. A relatively simple high r.p.m. motor driven by either of these energy sources may be linked to such various output devices as gear trains, ratchet mechanisms and the like to adapt the power source to a broad variety of requirements associated with various assembly operations.

A frequent requirement of such power tools is the capability of reversing the direction of output in order to facilitate, for example, the removal of a threaded fastener which may have been partially or improperly inserted or which must be removed to disassemble a component.

In hand tools powered by electricity, reversal of the electric motor is a somewhat more difficult problem than is immediately apparent. It is well known that reversing the polarity of electrical power supplied to certain windings in the motor will reverse the direction of rotation and that this polarity reversal can be achieved by simple switch mechanisms. Unfortunately, the mechanical shock associated with a high speed reversal to which the motor rotor is subjected as well as the electrical transients and back e.m.f. generated during the reversal operation to which the switching mechanism is subjected generally shortens the service life of the tool and lowers its reliability.

In tools driven by compressed air, the means most commonly utilized to provide bi-directional rotation is a vane motor having two inlet ports symmetrically disposed on opposite halves of the vane motor chamber and a single exhaust port positioned equidistant from the two inlet ports. Compressed air entering one inlet port and exiting the single exhaust port causes the vane motor to rotate in one direction whereas air entering the other inlet port and exiting the single exhaust port causes rotation of the vane motor in the opposite direction. A major drawback of a reversible air motor of this design is its reduced power output. Since the air must enter, expand and exit the vane motor in less than one hundred eighty degrees, the recovered energy and thus the power produced by the air motor is less than that which can be produced in a conventional unidirectional motor wherein the circumferential separation between the inlet and outlet ports permits effective utilization of the expensive power of the air over approximately two hundred forty degrees. Thus, a bi-directional air motor of this design is less efficient and produces less power than a comparable unidirectional motor.

The common alternative to utilizing a bi-directional air or electric motor in a hand tool comprehends incorporating a separate mechanism in tandem with the motor for providing a selectively reversible output. Generally these devices also exhibit somewhat reduced power output when compared to the output of a unidirectional power tool. In this case, the power reduction is due to the additional mechanism, typically gearing, in the reversing device. Such add-on reversing devices typically increase the weight of the power tool by a substantial amount. On the production line, where an operator may lift, move and position the tool constantly for several hours, such additional weight dramatically increases worker fatigue. The size of the tool is also an important consideration since it is often necessary to position and operate the tool within the structure being assembed such as, for example, a door or fender well of an automobile. A tool having the requisite reversing capability may, however, be rendered marginally or totally unusable in a given application if, due to its bulk and lack of maneuverability, it cannot engage or cannot easily be manipulated to engage a given fastener.

A production process that requires rotational speed substantially below that of the motor output and high torque as well as bi-directional rotation will generally require an even more complex mechanism. Components in addition to those necessary to produce a bi-directional output may be required and the size and weight of the reversing mechanism may then seriously limit its use as a production line tool.

SUMMARY OF THE INVENTION

The invention comprises a bi-directional, speed reducing mechanism for use with power hand tools and includes a pair of juxtaposed epicyclic gear trains mounted in a common carrier which each independently engage a pair of coaxially disposed cages or ring gears. The cages may be selectively locked to or released from an outer housing by means of a pair of identical wrap springs which function as brakes to alternately lock one of the pair of ring gears while releasing the other to effect selective bi-rotational output of the mechanism. The reversing mechanism also effects a speed reduction. Depending upon the specific choice of gears in the mechanism, reduction ratios in the range from 3.5:1 to 9:1 may be achieved. The reversing mechanism is also capable of providing different speed reduction ratios in the forward and reverse output directions. Again, the choice of components in the great trains governs such reduction ratios.

The reversing mechanism is contained within a generally cylindrical housing having a diameter approximately equal to that of the housing of a conventional vane motor to which it is assembled. A circumferential control ring disposed about the housing may be rotated relative to the housing by the operator to select either forward or reverse direction of output rotation.

In the forward mode of operation which provides an output rotation in the same direction as the input rotation as well as speed reduction and torque increase, the first cage is restrained by its surrounding wrap spring whereas the second cage is released by its corresponding wrap spring and is free to rotate. Both epicyclic gear trains are disposed within a common carrier and the first gear train is driven directly from the input shaft. Since the cage with which the first epicyclic gear train is engaged is restrained from motion, the carrier rotates within it in the same direction as the input shaft. An output shaft is linked directly to the carrier and transfers rotational power out of the mechanism. In the direction reversing mode, the second cage is restrained by its corresponding wrap spring and the first cage is released such that it may rotate freely. The second epicyclic gear train comprises pairs of gears in tandem wherein one of each pair of gears is driven indirectly by the input shaft and the other of each pair of gears engages the second cage or ring gear. With the cage surrounding the second epicyclic gear train restrained by its wrap spring, the common carrier and thus the output shaft rotates in the opposite direction from the input shaft.

It is thus the object of the instant invention to provide a bi-directional drive mechanism for use with power hand tools.

It is a further object of the instant invention to provide such a bi-directional mechanism which can be retrofit to existent power tools which are separable between the motor and drive head.

It is a still further object of the instant invention to provide a bi-directional mechanism in a compact, lightweight package which does not appreciably add to the weight and size of a power tool.

It is a still further object of the instant invention to provide a bi-directional speed reduction mechanism which is capable of withstanding cycling between forward and reverse modes under conditions of full power and load.

It is a still further object of the instant invention to provide a bi-directional reversing mechanism incorporating speed reduction and torque increase capabilities.

Further objects and advantages of the instant invention will become apparent by reference to the following specification and attached drawings.

DESCRIPTION OF THE PREFERRED EMBODIMENT

Figure 1:
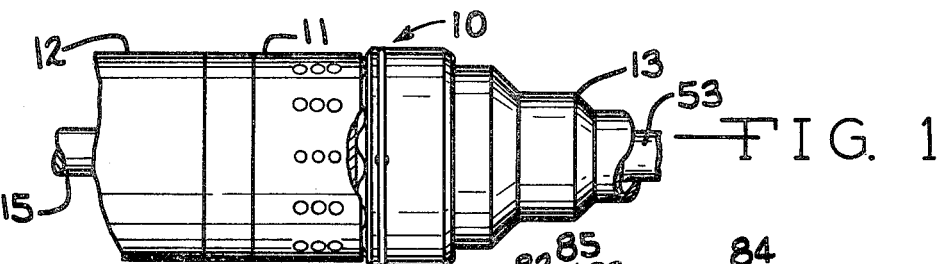
FIG. 1 is a side elevational view of a bi-directional speed reducing mechanism interconnected with a power hand tool.

Referring now to FIG. 1, a bi-directional speed reducing mechanism according to the instant invention is generally designated by the reference numeral 10. The bi-directional mechanism 10 includes a generally cylindrical housing 11 which encloses the operative components of the bi-directional mechanism 10 as well as having suitable securing means which facilitates its installation between the housing of a conventional unidirectional air motor 12 and a power tool head 13. An input shaft 15 transfers power from the air motor 12 to the bi-directional mechanism 10 and an output shaft 16 transfers rotary power from the bi-directional mechanism 10 to the tool head 13 or similar device.

Figure 2:
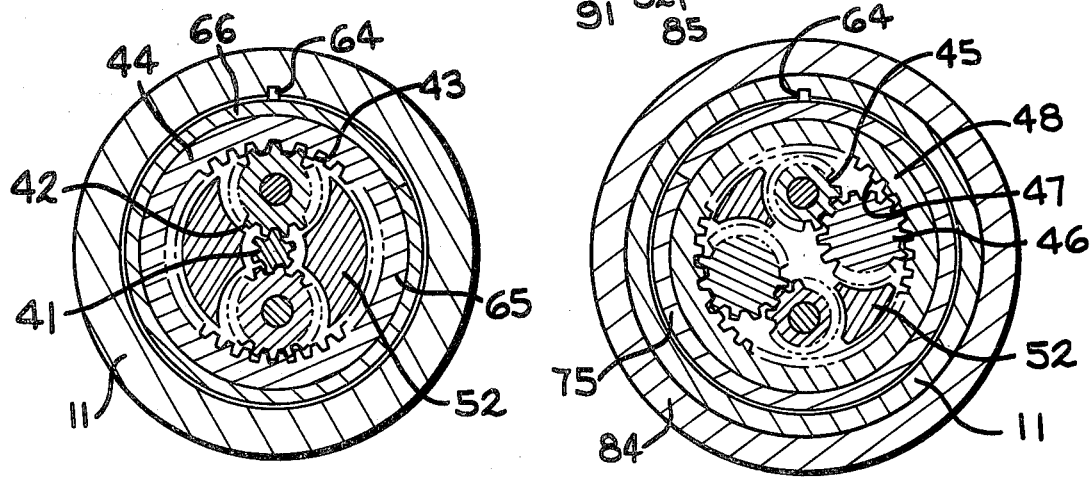
FIG. 2 is a full sectional, side elevational view of a bi-directional speed reduction mechanism according to the instant invention.

Referring now to FIG. 2, the housing of the air motor 12 includes female threads 20 disposed on its inner surface and the cylindrical housing 11 includes complementarily positioned male threads 21 which are engageable by the female threads 20. The threaded interconnection comprising the female and male threads 20 and 21, respectively, provides selective securement of the air motor 12 to the cylindrical housing 11. Concentrically disposed within the cylindrical housing 11 adjacent its end most proximate the male threads 21 is a circular bearing support 22. The bearing support 22 is seated within a suitable circumferential groove 23 disposed in the inner wall of the housing of the air motor 12 and itself defines a circular re-entrant portion 24 within which is seated a suitable anti-friction bearing such as a ball bearing 25. The ball bearing 25 is frictionally retained within the re-entrant portion 24 by virtue of a slight interference fit and rotatably mounts and centers the input shaft 15 within the housing 11. A demountable snap ring 26 which seats in a suitable circumferential groove 27 disposed in the input shaft 15 positions the input shaft 15 axially relative to the bearing 25 and unidirectionally maintains this relative position. The circular bearing support 22 also defines a plurality of longitudinally disposed apertures 28 which are disposed in the flat, radially extending region of the circular bearing support 22 and which provide communication between its two faces. The circular bearing support 22 also defines a circumferential grooves 29 within which is seated a resilient O-ring seal 30 which may be fabricated of rubber, neoprene or similar material. An annular spacer 31 is frictionally retained over the portion of the circular bearing support 22 adjacent the O-ring seal 30 by means of both a slight interference fit and the additional frictional retention afforded by the O-ring seal 30. The O-ring seal 30 also provides a substantially air tight seal between the circular bearing support 22 and the annular spacer 31. The cylindrical housing 11 defines a plurality of radially disposed apertures 32 which are spaced circumferentially about its periphery. The cylindrical housing 11 further generally defines a wide, circumferential, re-entrant groove 33. An annulus 34 having a plurality of radially oriented exhaust apertures 35 disposed about its periphery seats over the groove 33 in suitable circumferential channels 36 and defines a chamber 37. A passage for exhaust air from the housing of the air motor 12 is thus defined and extends from the plurality of apertures 28, along the annular spacer 31, radially outwardly through the plurality of apertures 32, through the chamber 37 and out the exhaust apertures 35.

Figures 3, 4:
FIG. 3 is a full sectional view of a bi-directional speed reduction mechanism according to the instant invention taken along line 3—3 of FIG. 2.
FIG. 4 is a full sectional view of a bi-directional speed reduction mechanism according to the instant invention taken along line 4—4 of FIG. 2.

Referring now to FIGS. 2, 3 and 4, the input shaft 15 tapers to a reduced diameter portion 40 which also defines a pinion 41 adjacent its terminus. The pinion 41 functions as the spun drive gear for a pair of planet or idler gears 42. The pair of idler gears 42 mesh with a first ring gear 43 disposed on the inner surface of a first cage 44. The pair of idler gears 42 are compound, i.e., each is directly operably linked to one of a second pair of idler gears 45. The second pair of idler gears 45 is in constant mesh with a third pair of idler gears 46 which in turn mesh with the teeth of a second ring gear 47 disposed on the inner surface of a second cage 48. The compound first and second pair of idler gears 42 and 45 are disposed upon a pair of longitudinally oriented stub shafts 50. The pair of stub shafts 50 are rotatably mounted in suitable anti-friction bearings such as roller bearings 51 disposed adjacent the termini of the stub shafts 50. The roller bearings 51 are in turn disposed within a carrier 52 which is generally concentrically positioned within the cylindrical housing 11. The carrier 52 also includes a reduced diameter portion which defines an output shaft 53. The first epicyclic gear train thus generally comprises the sun or drive pinion 41, the first pair of idler gears 42, the first ring gear 43 and the carrier 52 and the second epicyclic gear train comprises the drive pinion 41, the compound first and second pair of idler gears 42 and 45, respectively, the third pair of idler gears 46, the second ring gear 47 and the carrier 52.

Referring once again to FIG. 2, the carrier 52 is rotatably and concentrically disposed within the housing 11 by means of a pair of roller bearings 55. The roller bearings 55 seat about an appropriately sized portion of the carrier 52 and are positively retained by a pair of suitable demountable snap rings 56 disposed in a pair of circumferential annular grooves 57. The periphery of each of the bearings 55 is seated and frictionally retained within an appropriately sized circumferential channel 58 cut into the first and second ring gears 43 and 48, respectively. A first ring gear locator 60 is seated within and generally positioned between a circumferential channel 61 disposed in the annular spacer 31 and the inner wall of the cylindrical housing 11. The first ring gear locator 60 also includes a semi-circular key notch 62 which receives an appropriately sized Woodruff key 63. The Woodruff key 63 is received in a longitudinal groove 64 disposed on the inner wall of the cylindrical housing 11 and cooperation between these elements inhibits rotation of the first ring gear locator 60 relative to the housing 11. The first ring gear locator 60 further includes a circumferential, longitudinally extending surface 65 about which several turns of a dual-diameter wrap spring 66 are positioned. The remaining turns of the wrap spring 66 are positioned about a circumferential, longitudinally extending surface 67 on the outside of the first cage 44. Preferably, the outside diameters of the surfaces 65 and 67 are equal. In a mechanism 10 wherein the input shaft 15 rotates in a clockwise direction as viewed from the left in FIG. 5, the wrap spring 66 is of left hand configuration and comprises approximately twelve to thirteen turns. The portion of the wrap spring 66 adjacent the circumferential surface 65 is a slightly smaller diameter than that adjacent the circumferential surface 67. In axial alignment with the juxtaposed edges of the circumferential surfaces 65 and 67 is a finite step in the inside diameter of the wrap spring 66 which occupies approximately one-half turn on the spring 66. Typically, the diameter of the smaller section of the wrap spring 66 disposed about the circumferential surface 65 is such that it is tightly retained thereon. The diameter of the larger portion of the wrap spring 66 which is positioned about the circumferential surface 67 may be, for example, 0.020 inches larger in diameter such that it may selectively engage or release the surface about which it is disposed.

A second set of components, like those described above, namely a second ring gear locator 70, having a semi-circular notch 71 within which is seated a Woodruff key 72, inhibits relative rotation between the second ring gear locator 70 and the housing 11. In similar fashion, the second ring gear locator 70 defines a circumferential, longitudinally extending surface 73 upon which the smaller diameter half of a second dual-diameter wrap spring 74 is disposed. The remaining larger half of the wrap spring 74 is disposed about a circumferential, longitudinally extending surface 75 on the outside of the second cage 48 which preferably has the same outside diameter as the surface 73. Although mounted end-for-end in the mechanism 10 relative to the wrap spring 66, the wrap spring 74 is in all respects identical to the first wrap spring 66.

The sense of the wrap springs 66 and 74, i.e., whether they are left hand wrap or right hand wrap must be matched to the direction of input shaft rotation in order to assure proper operation of the mechanism 10. Conventionally, unidirectional assembly tool motors such as the air motor 12 rotate the input shaft 15 in a clockwise direction as viewed from the left in FIG. 5. In this case, both of the wrap springs 66 and 74 are left hand wrap springs. Conversely, proper operation of the mechanism 10 is achieved when driven in a counterclockwise direction as viewed from the left in FIG. 5 when both of the wrap springs 66 and 74 are of right hand wrap configuration.

Figure 5:
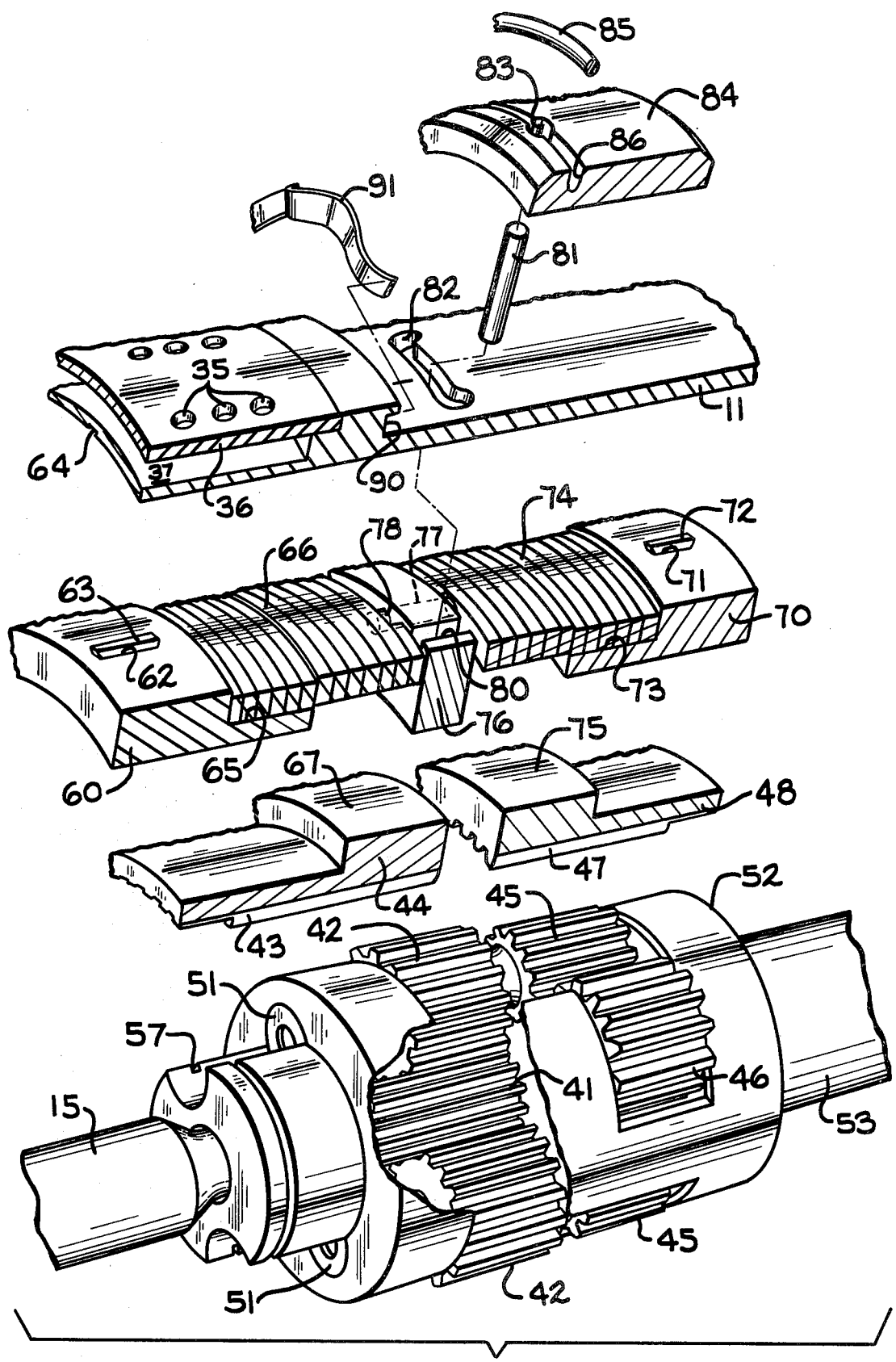
FIG. 5 is an exploded perspective view of the gear carrier, planetary gear cages and wrap spring cage brakes which are incorporated into the instant invention.

Referring now to FIGS. 2 and 5, a locking ring 76 is rotatably disposed between opposed ends of the first and the second cages 44 and 48, respectively. The locking ring 76 defines a single longitudinally oriented opening 77 within which is securely mounted a spring activator pin 78. One end of each of the identical wrap springs 66 and 74 is adjacent opposite side and ends of the activator pins 78. Rotation of the locking ring 76 and movement of the activator pin 78 thus moves the adjacent ends of the wrap springs 66 and 74, expanding one while allowing the other to contract. The locking ring 76 also defines a pair of radially opposed axial slots 80 within which radially extending locating pins 81 are positioned. The locating pins 81 extend through a pair of opposed U-shaped slots 82 defined by the cylindrical housing 11 and are secured in radially opposed openings 83 disposed within an annular control collar 84. The locking pins 81 are retained within the locking ring 76 and the control collar 84 by means of retaining ring 85. The retaining ring 85 seats in a circumferential channel 86 disposed about the periphery of the control collar 84. An enlarged diameter portion of the cylindrical housing 11 adjacent the control collar 84 defines a radially extending surface 90 which surrounds the housing 11. Disposed between the surface 90 and the adjacent edge of the control collar 84 is a wave washer 91. The wave washer 91 provides a biasing force against the reversing collar 84 which encourages the pins 81 to seat in one or the other of the opposed ends of the U-shaped slots 82. As will be more fully described below, one end of the U-shaped slots 82 corresponds to output rotation in one direction whereas the opposite end corresponds to rotation of the output shaft 53 in the other direction.

Operation of the bi-directional speed reducing mechanism 10 is best understood by referring to FIGS. 2 and 5. In a forward drive mode, i.e., that mode in which input shaft 15 rotates clockwise and in which the output shaft 53 rotates in the same direction as the input shaft 15 and the mechanism 10 provides a speed reduction and torque increase, the reversing collar 84 is urged counterclockwise when viewed from the air motor 12 or the left end as viewed in FIG. 5. The locking pin 81 is thus seated in the left detent of the U-shaped slot 82. So positioned, the locking ring 76 which is secured to the control collar 84 and the spring activator pin 78 which is secured within the locking ring 76 is moved away from the end of the wrap spring 66 such that it contracts about the circumferential surface 67 while at that same time the spring activator pin abuts and translates the end of the wrap spring 76, expands it and substantially eliminates contact and frictional linkage between the wrap spring 74 and the circumferential surface 75. The first cage 44 is thus inhibited from rotation relative to the housing 11 whereas the second cage 48 is free to rotate. Clockwise rotation of the input shaft 15 produces a corresponding reverse rotation of the first pair of idler gears 42 and their engagement with the ring gear 43 disposed on the inner surface of the restrained first cage 44 causes the idler gears 42 to move clockwise inside of and relative to the first cage 44. This clockwise movement of idler gears 42 rotates the carrier 52 and the output shaft 53 carried thereby in the same clockwise direction as the input shaft 15 but at a reduced speed.

In the second mode of operation, i.e., that mode which provides both a reversal of direction of the output relative to the input as well as speed reduction, the control collar 84 is moved from its counterclockwise position relative to the housing 11 to its clockwise position wherein the locking pin 81 is disposed in the front or rightmost detent in the U-shaped slot 82 as viewed in FIG. 5. In this position of the control collar 84 the locking ring 76 and the spring activator pin 78 are correspondingly moved clockwise relative to the housing 11. The wrap spring 66 is thus expanded such that substantially all frictional contact between it and the circumferential surface 67 is precluded whereas the wrap spring 74 is allowed to contract and frictionally engage the circumferential surface 75. Thus the first cage 44 is free to rotate whereas the second cage 48 is inhibited from rotation relative to the housing 11. Transfer of rotary power through the reversing mechanism 10 is thus from the input shaft 15 to the compound pair of first and second idler gears 42 and 45, and to the third pair of idler gears 46. The third pair of idler gears 46 are in constant mesh with the second ring gear 47 on the inner surface of the second cage 48. Since the second cage 48 is fixed relative to the carrier 52 and the housing 11 by the action of the wrap spring 74, the carrier 52 rotates, and rotates in the opposite direction from the first mode of operation described above and thus the output shaft 53 likewise rotates oppositely from the direction of rotation of the input shaft 15.

As previously noted, the operation of the bi-directional mechanism 10 is dependent upon appropriate selection of and cooperation between the direction of rotation of the air motor 12 (and thus direction of rotation of the input shaft 15) and the sense of the wrap springs 66 and 74. The foregoing description of operation has assumed that the input shaft 15 rotates in a clockwise direction and that the wrap springs are left hand sense. For counterclockwise input shaft rotation, the wrap springs must be right hand sense. In this case, the directions in which the control collar 84 must be moved to achieve same direction and reverse direction output are reversed but the active gear train providing a given relative direction of output rotation remains the same. That is, with counterclockwise input rotation and left hand wrap springs 66 and 74, counterclockwise output rotation is achieved by moving the control collar 84 to its forward, rightmost detented position such that the first cage 44 is restrained by the wrap spring 66 and the second cage 48 is released. Conversely, clockwise (reverse) direction rotation of the output shaft 53 is achieved by moving the control collar 84 to the rear, leftmost detented position, freeing the first cage 44 and restraining the second cage 48.

As also noted previously, the reversing mechanism 10 is capable of providing speed reduction ratios generally in the range of from 3.5:1 to 9:1. By way of example, the pinion 41 on the input shaft 15 may have six teeth, the first pair of idler gears 42 may have seventeen teeth and the first ring gear 43 may have forty-two teeth. In the forward mode of operation, this choice of gearing provides a 8.1:1 speed reduction ratio. Utilizing this same gearing, i.e., six teeth on the pinion 41 and seventeen teeth on the first pair of idler gears 42, the second pair of idler gears 45 may have thirteen teeth, the third pair of idler gears 46 may have fourteen teeth and the second ring gear 47 may also include forty-two teeth. The reduction ratio thus provided in the second, reverse mode of operation is 8.15:1. Selection of idlers and ring gears having different numbers of teeth from those recited in the above example will provide correspondingly different reduction ratios. From the foregoing example, it should be apparent that the speed reducing mechanism 10 is capable of providing a gear reduction ratio in one, e.g., the forward, mode of operation while providing different and distinct gear reduction ratio when operated in the other, e.g., reverse, mode of operation.

The foregoing disclosure is the best mode devised by the inventor for practicing this invention. It is apparent, however, that devices incorporating modifications and variations to the instant invention will be obvious to one skilled in the art of bi-directional reversing mechanisms. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A bi-directional speed reducing mechanism comprising a housing having a first and second fixed supports therein, a rotatable input shaft, a rotatable output member, a first epicyclic gear train contained in said housing selectively operative to transmit the rotation of the input shaft to the output member in the same rotational direction at reduced speed and increased torque, a second epicyclic gear train contained in said housing selectively operative to transmit the rotation of the input shaft to the output member in an opposite rotational direction at reduced speed and increased torque, and means selectively operative to engage either the first or second epicyclic gear train for operating the output member in the selected directional mode, said means to engage including first and second wrap springs of same hand each having a first portion of a first inner diameter and a second portion of a second larger inner diameter, with the diameter transition between the first and second portions being effected in less than one spring wrap, said first spring portion of each said first and second wrap spring being respectively secured to said first and second fixed supports in said housing, and an actuator alternately to effect a diametrical decrease in one of said second spring portions for engagement while effecting a diametrical increase in the other second spring portion to release engagement.

2. A bi-directional speed reducing mechanism comprising a housing having first and second fixed supports therein, a rotatable input shaft, a rotatable output member, a first epicyclic gear train having a first ring gear contained in said housing selectively operative to transmit the rotation of the input shaft to the output member in the same rotational direction at reduced speed and increased torque, a second epicyclic gear train having a second ring gear contained in said housing selectively operative to transmit the rotation of the input shaft to the output member in an opposite rotational direction at reduced speed and increased torque, and means selectively operative to engage either the first or second ring gear of said first or second epicyclic gear train for operating the output member in the selected directional mode, said means to engage including first and second wrap springs of same hand each having a first portion of a first inner diameter and a second portion of a second larger inner diameter, said first spring portion of each said first and second wrap spring being respectively secured to said first and second fixed supports in said housing, and said second spring portion of each said first and second wrap spring being radially outside and in respective alignment with the first and second ring gears, and an actuator alternately to effect a diametrical decrease in one of said second spring portions for engagement with one of said ring gears in alignment therewith to restrain the same, while effecting a diametrical increase in the other second spring portion to release engagement of the other ring gear in alignment therewith, with said respective second spring portions of said first and second wrap springs being alternately cycled by said actuator to contract one while the other is being expanded.

3. The bi-directional speed reducing mechanism of claim 2 wherein said actuator is positioned between the first and second wrap springs adjacent respective ends of their second larger inner diameter portions, said actuator having an activator pin connected to the ends of both springs so that rotation of the actuator and activator pin mounted thereon radially expands the second portion of one wrap spring while radially contracting the second portion of the other.

4. The bi-directional speed reducing mechanism of claim 3 wherein the actuator is positioned inside said housing and is reciprocally moved by an external control collar connected to the actuator by locking pin means received in elongated slot means in the housing to permit limited, concurrent movement of the collar and actuator.

5. The bi-directional speed reducing mechanism of claim 4 wherein the housing slot means has two stops at the respective ends thereof and the pin means is spring biased into positive retention in one of the stops which corresponds to the collar and actuator position operatively producing the selected directional output mode.

* * * * *